US012038133B2

(12) United States Patent
Badalyan et al.

(10) Patent No.: US 12,038,133 B2
(45) Date of Patent: Jul. 16, 2024

(54) CANISTER CAPS FOR CRYOPRESERVATION APPLICATIONS

(71) Applicant: CooperSurgical, Inc., Trumbull, CT (US)

(72) Inventors: Nicole Badalyan, Fair Lawn, NJ (US); Kevin Lord, Clifton, NJ (US); Sydney Zoretic, West Chester, PA (US); Claire Tantillo, Garnerville, NY (US)

(73) Assignee: CooperSurgical, Inc., Trumbull, CT (US)

( * ) Notice: Subject to any disclaimer, the term of this patent is extended or adjusted under 35 U.S.C. 154(b) by 503 days.

(21) Appl. No.: 17/382,672

(22) Filed: Jul. 22, 2021

(65) Prior Publication Data
US 2022/0026029 A1    Jan. 27, 2022

Related U.S. Application Data

(60) Provisional application No. 63/055,477, filed on Jul. 23, 2020.

(51) Int. Cl.
*F17C 13/06* (2006.01)
*A01N 1/02* (2006.01)
*B65D 51/24* (2006.01)
*F17C 13/00* (2006.01)

(52) U.S. Cl.
CPC ............ *F17C 13/06* (2013.01); *A01N 1/0268* (2013.01); *B65D 51/242* (2013.01); *F17C 13/006* (2013.01); *F17C 2205/0165* (2013.01)

(58) Field of Classification Search
CPC ... A01N 1/0268; A01N 1/0273; F17C 13/006; F17C 2205/0165; B65D 51/242; B65D 51/249
See application file for complete search history.

(56) References Cited

U.S. PATENT DOCUMENTS

| 1,064,420 | A | | 6/1913 | Bartlett | |
| 2,503,544 | A | * | 4/1950 | Clore | B65D 71/0011 206/163 |
| 3,202,309 | A | * | 8/1965 | Simpson | A47G 23/0241 215/396 |
| 3,707,079 | A | | 12/1972 | Hawker | |

(Continued)

FOREIGN PATENT DOCUMENTS

| CN | 208739994 | 4/2019 |
| DE | 102014104330 | 10/2015 |

(Continued)

OTHER PUBLICATIONS

International Search Report and Written Opinion of the International Searching Authority for International Application No. PCT/US2021/042814, dated Dec. 6, 2021.

(Continued)

*Primary Examiner* — Don M Anderson
(74) *Attorney, Agent, or Firm* — Fish & Richardson P.C.

(57) ABSTRACT

A cap for closing a canister includes a receptacle including a bottom wall, and one or more walls extending upward from the bottom wall and defining an opening of the receptacle that is configured to receive a body of the canister, and a handle extending upward from the receptacle and defining vertical slots that are configured to receive respective hooks of the canister.

16 Claims, 9 Drawing Sheets

(56) References Cited

U.S. PATENT DOCUMENTS

| | | | | |
|---|---|---|---|---|
| 5,050,760 | A * | 9/1991 | Garcia | B65D 25/32 |
| | | | | 220/773 |
| 5,335,954 | A * | 8/1994 | Holub | A45F 5/10 |
| | | | | 215/396 |
| 5,392,943 | A * | 2/1995 | Delatte | A01N 1/0263 |
| | | | | 62/51.1 |
| D643,289 | S * | 8/2011 | Harlan | D7/622 |
| 8,099,967 | B2 * | 1/2012 | Jia | G01N 1/42 |
| | | | | 62/266 |
| D740,618 | S * | 10/2015 | Knoll | D7/622 |
| 2008/0012368 | A1 * | 1/2008 | Kent-Fawkes | A47G 23/0258 |
| | | | | 294/137 |
| 2009/0065469 | A1 * | 3/2009 | McClellan | A45F 5/102 |
| | | | | 215/390 |
| 2013/0232998 | A1 * | 9/2013 | Ward | A01N 1/0257 |
| | | | | 62/51.1 |
| 2014/0061214 | A1 * | 3/2014 | Bruno | B65D 25/2867 |
| | | | | 220/756 |
| 2016/0057992 | A1 * | 3/2016 | Lou | A01N 1/0268 |
| | | | | 435/284.1 |
| 2018/0184645 | A1 | 7/2018 | Harston et al. | |
| 2018/0292051 | A1 * | 10/2018 | Ally | A01N 1/0268 |
| 2020/0120925 | A1 * | 4/2020 | Ally | A01N 1/0268 |
| 2022/0088592 | A1 * | 3/2022 | Sela | B01L 3/527 |

FOREIGN PATENT DOCUMENTS

| | | |
|---|---|---|
| JP | S58-120964 | 7/1983 |
| JP | H01-104163 | 4/1989 |
| JP | 2007-302567 | 11/2007 |
| JP | 2018-054420 | 4/2018 |
| JP | 2018-088992 | 6/2018 |
| WO | WO 2018/003786 | 1/2018 |
| WO | WO 2019/165348 | 8/2019 |

OTHER PUBLICATIONS

Lieberman et al., "Maintaining semen quality by improving cold chain equipment used in cattle artificial insemination", *Scientific Reports,* vol. 6, No. 1, pp. 1-9, dated Jun. 17, 2016.

Schiewe, M. C. et al., "Comprehensive assessment of cryogenic storage risk and quality management concerns: best practice guidelines for ART labs", *Journal of Assisted Reproduction and Genetics,* vol. 36, pp. 5-14 (2019).

* cited by examiner

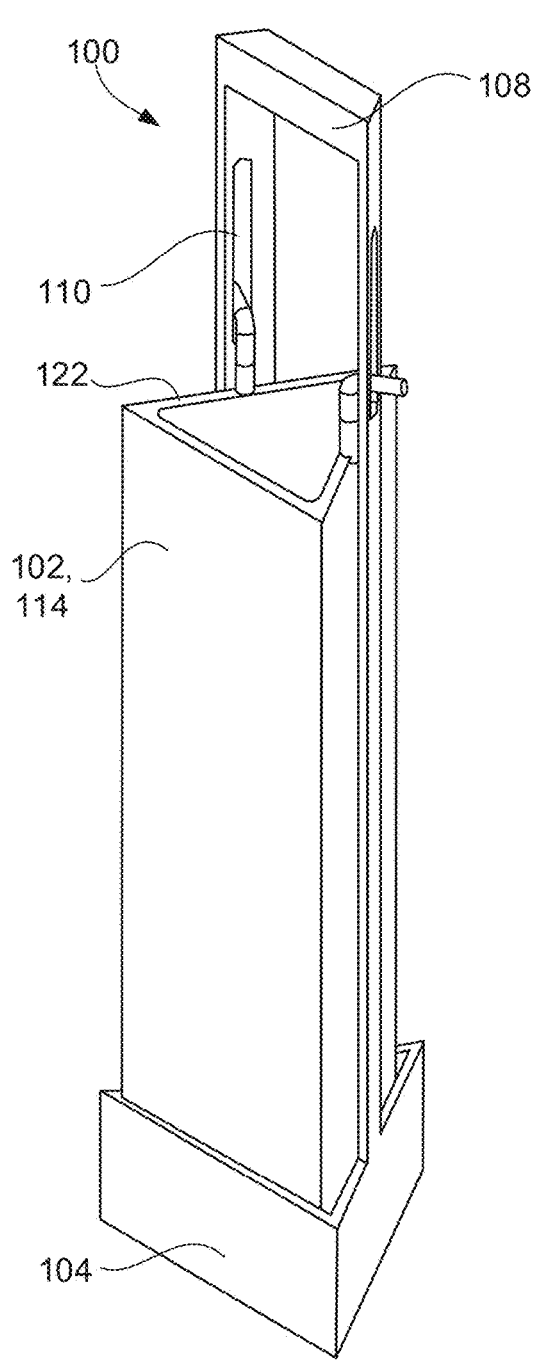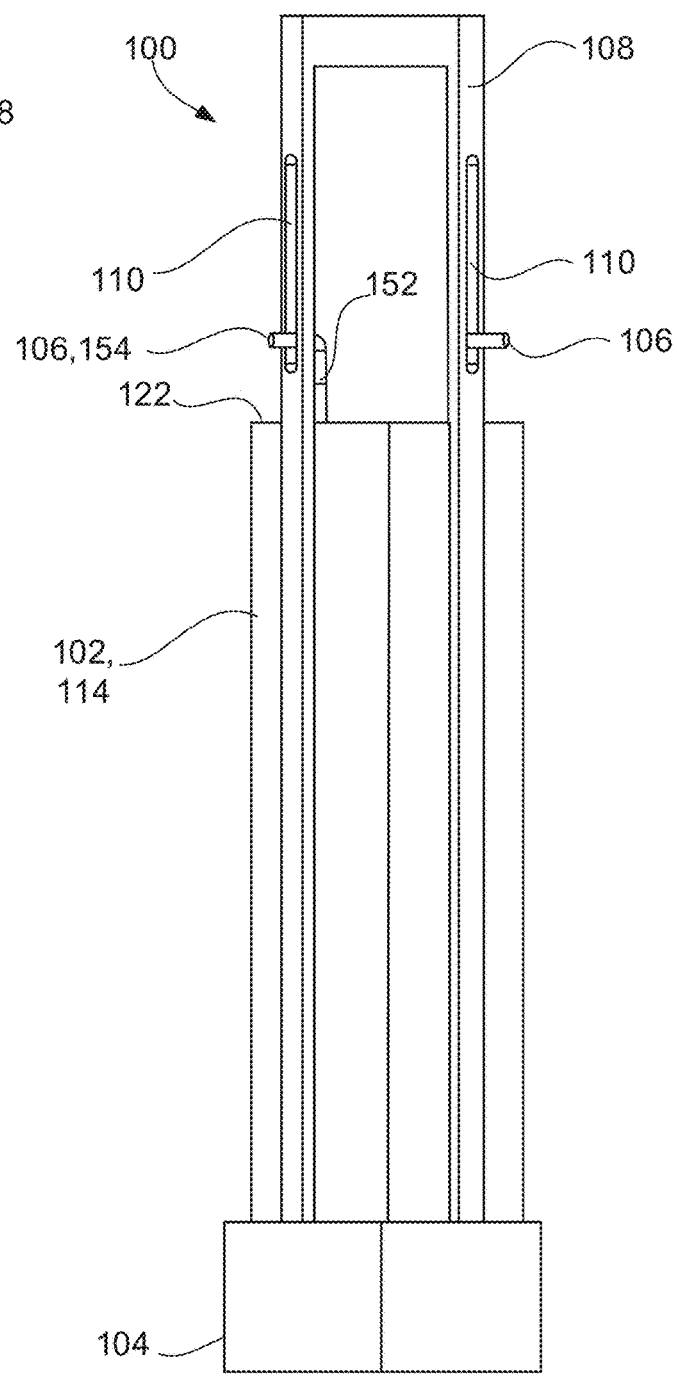
FIG. 1
FIG. 2

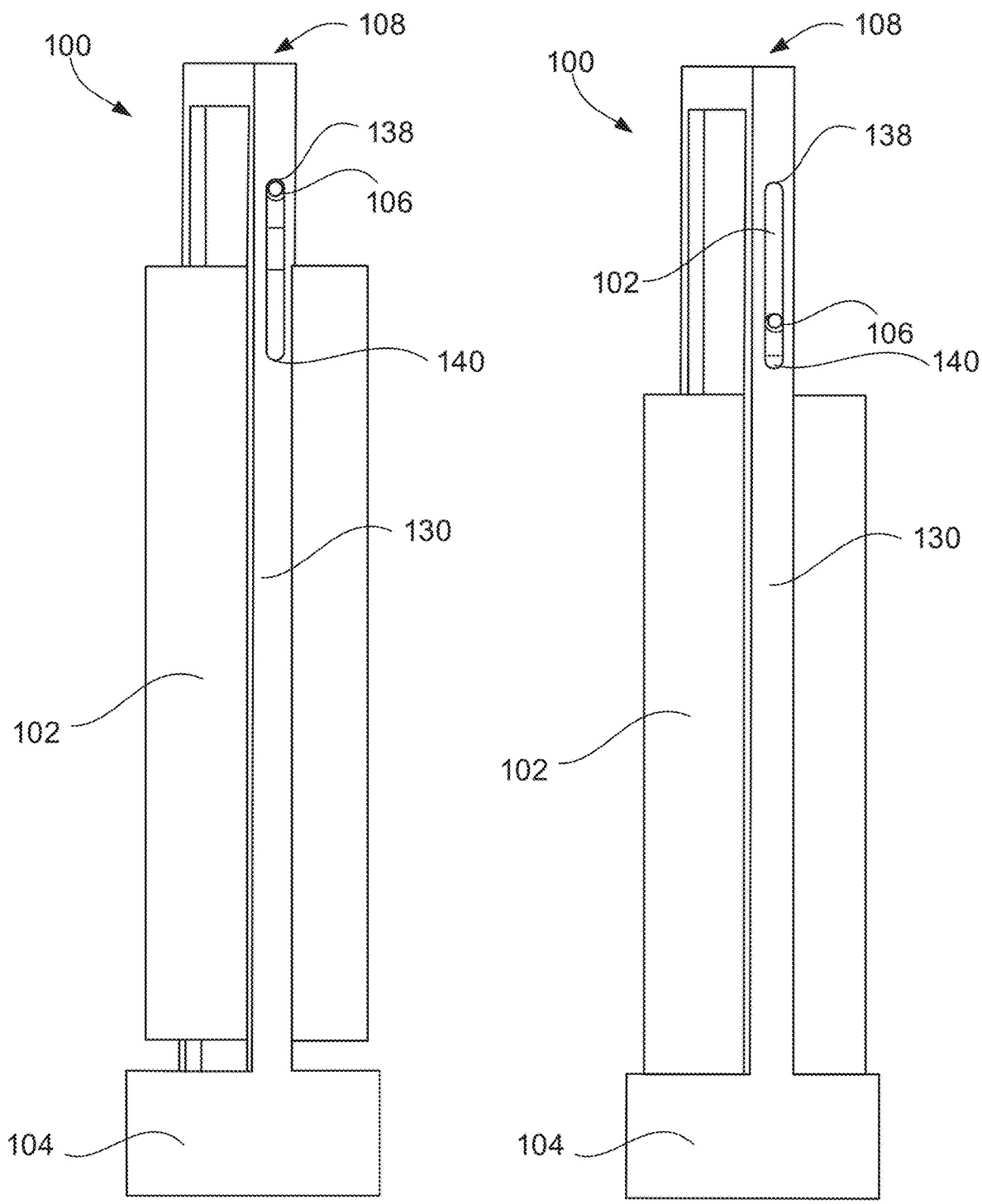

CANISTER CAPS FOR CRYOPRESERVATION APPLICATIONS

CROSS-REFERENCE TO RELATED APPLICATIONS

This application claims priority to U.S. Provisional Patent Application No. 63/055,477, filed on Jul. 23, 2020. The entire content of this application is incorporated herein by reference.

TECHNICAL FIELD

This disclosure relates to caps for closing canisters that store cryopreservation containers and devices within a cryogenic substance.

BACKGROUND

Cryogenic storage dewars are specialized vacuum containers used for safely storing cryogenic substances (e.g., liquid nitrogen). Sample storage devices are typically used with large cryogenic storage dewars, and these sample storage devices can include hanging racks or hanging canisters that are suspended within a cryogenic storage dewar. Sample storage devices can be used to store and organize samples (e.g., biological samples, such as mammalian cells) within a cryogenic substance for cryopreservation.

SUMMARY

In general, this disclosure relates to caps for closing canisters that store cryopreservation devices containing biological samples. Such canisters are stored within a cryogenic substance (e.g., liquid nitrogen and/or nitrogen vapors) inside of a cryogenic storage container (e.g., a dewar).

In one aspect, a cap for closing a canister includes a receptacle including a bottom wall, and one or more walls extending upward from the bottom wall and defining an opening of the receptacle that is configured to receive a body of the canister; and a handle extending upward from the receptacle and defining vertical slots that are configured to receive respective hooks of the canister.

Embodiments may include one or more of the following features.

In some embodiments, the receptacle has a triangular shape.

In certain embodiments, the plurality of side walls includes one or more walls.

In some embodiments, the receptacle has a cylindrical shape.

In some embodiments, the handle has an inverted U shape.

In certain embodiments, the handle includes two vertical members that extend respectively from opposite walls of the one or more walls.

In some embodiments, the two vertical members respectively define the vertical slots.

In certain embodiments, the handle further comprises a horizontal member that extends between the two vertical members.

In some embodiments, the horizontal member is configured to be grasped by a hand of a user.

In certain embodiments, the slots are spaced apart from the horizontal member by a distance of about 3 cm to about 5 cm.

In certain embodiments, the handle has a length of about 24 cm to about 37 cm.

In another aspect a canister assembly includes a canister comprising a body for storing samples and hooks that extend from the body for engaging a surrounding housing, and a cap for closing the canister. The cap includes a receptacle including a bottom wall, and one or more walls extending upward from the bottom wall and defining an opening of the receptacle that is configured to receive the body of the canister, and a handle extending upward from the receptacle and defining vertical slots in which the hooks of the canister are positioned.

In certain embodiments, each of the receptacle of the cap and the body of the canister has a triangular shape.

In some embodiments, each of the receptacle of the cap and the body of the canister has a cylindrical shape.

In some embodiments, the handle has an inverted U shape.

In certain embodiments, the handle comprises two vertical members that extend respectively from opposite walls of the one or more walls.

In some embodiments, the two vertical members respectively define the vertical slots.

In certain embodiments, the handle further comprises a horizontal member that extends between the two vertical members and that is configured to be grasped by a hand of a user.

In some embodiments, the hooks of the canister are slidable within the vertical slots of the cap.

In certain embodiments, the slots have a length of about 5 cm to about 8 cm.

In some embodiments, the receptacle of the cap is configured to receive the body of the canister in a nested arrangement.

In certain embodiments, the body of the canister comprises a bottom wall that defines a plurality of through holes for allowing passage of a fluid between the body and the receptacle of the cap.

In some embodiments, each through hole of the plurality of through holes has a diameter ranging from about 1 mm to about 4 mm.

In another aspect, a method of handling a canister includes pulling a handle of a cap upward, thereby moving slots of the handle upward with respect to hooks of the canister that are positioned within the slots and secured to a surrounding housing, the handle extending upward from a receptacle of the cap, and abutting a receptacle of the cap with a body of the canister to move the canister upward, thereby disengaging the hooks of the canister from the surrounding housing.

Embodiments may provide one or more of the following advantages.

In some embodiments, the canister assemblies provide for proper cooling of samples stored in the canister while the holder is engaged within a cryogenic storage dewar. Proper cooling of samples stored in the canister can be facilitated by the free flow of a cryogenic substance (e.g., liquid nitrogen and/or nitrogen vapors) in and out of multiple holes in the bottom wall of the canister.

Furthermore, the canister assemblies can provide a user (e.g., a clinician or a scientist) additional time, as compared to conventional cryogenic storage devices, to correctly identify and/or retrieve a correct sample from the canister assemblies. Typically, biological samples (e.g., mammalian cells or embryos) that have been cryopreserved and stored at about −196° C. in the presence of a cryogen are extremely sensitive to temperature fluctuations. As the amount of time that the sample is removed from the cryogenic environment (i.e., about −196° C.) increases, the risk of damage to the sample due to warming and/or thawing increases as well. For example, cryopreserved embryo samples have less than about 60 seconds at air temperature before potential irreversible damage occurs. The holder allows for some amount of the cryogenic substance to be trapped in the canister when the canister assembly is disengaged from and pulled out of the dewar. Thus, the samples can continue to be in contact with liquid nitrogen and/or nitrogen vapor, which prevents and/or delays the samples in the canister from warming up and/or thawing when the user temporarily removes them from the cryogenic environment.

In some embodiments, the canister assemblies can be modified to have various shapes (e.g., triangular or cylindrical), thereby allowing compatibility with various cryogenic storage devices. Furthermore, the shape of the canister assembly can improve the packing efficiency of multiple canister assemblies within a cryogenic container, which increases carrier capacity and may further translate into a decrease in clinic floor space used per sample stored. Thus, the canister assemblies may help reduce the cost of maintaining samples. Additionally, the shape of the canister assembly can improve the thermal efficiency of samples stored in the canister assembly during identification and/or retrieval (i.e., while a cryogenic container is open) by providing a reduced opening area between packed canisters, as compared to traditional cryogenic storage devices.

Other aspects, features, and advantages will be apparent from the description, the drawings, and the claims.

DESCRIPTION OF DRAWINGS

FIG. 1 is a perspective view of an example canister assembly that can be used to store a sample in a cryogenic environment.

FIG. 2 is a side view of the canister assembly of FIG. 1.

FIG. 8 is a side perspective view of the canister assembly of FIG. 1 in an "open" state.

FIG. 9 is a side perspective view of the canister assembly of FIG. 1 in a "closed" state.

DETAILED DESCRIPTION

Figure 3:
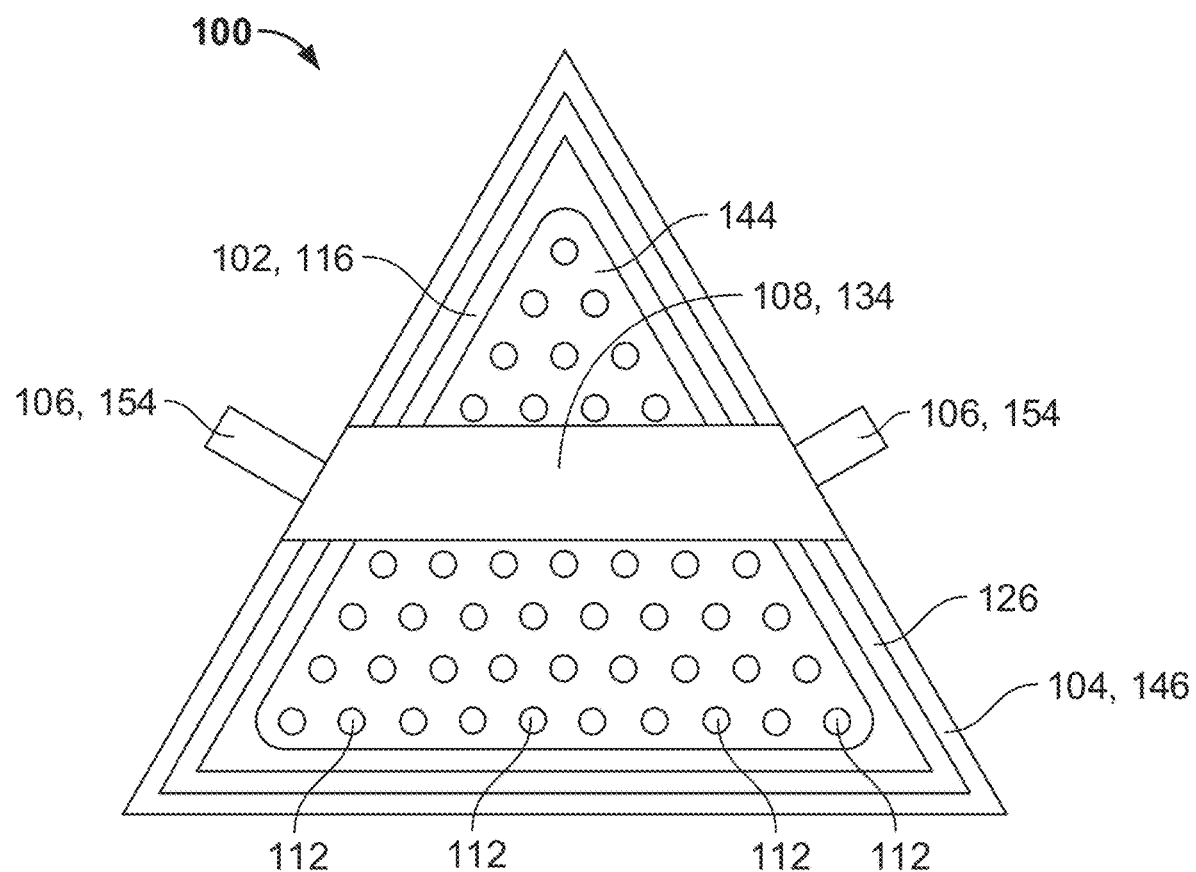
FIG. 3 is a top view of the canister assembly of FIG. 1.

FIGS. 1-3 illustrate a canister assembly 100 that can be used to store samples (e.g., biological samples) in a cryogenic storage container (e.g., a cryogenic storage dewar). The canister assembly 100 is a separable assembly that includes a canister 102 that defines an interior space where samples can be stored and a holder 104 formed to receive the canister 102. Canister 102 includes a body 114 and a pair of hooks 106 extending from a top edge 122 of the body 114.

Figure 4:
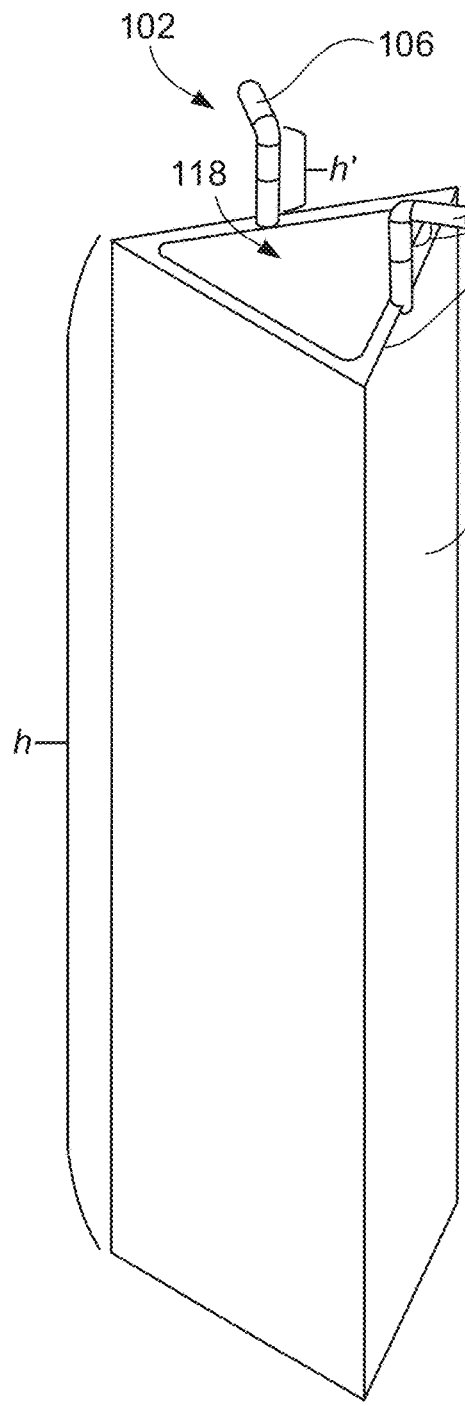
FIG. 4 is a perspective view of a canister of the canister assembly of FIG. 1.
Figure 5:
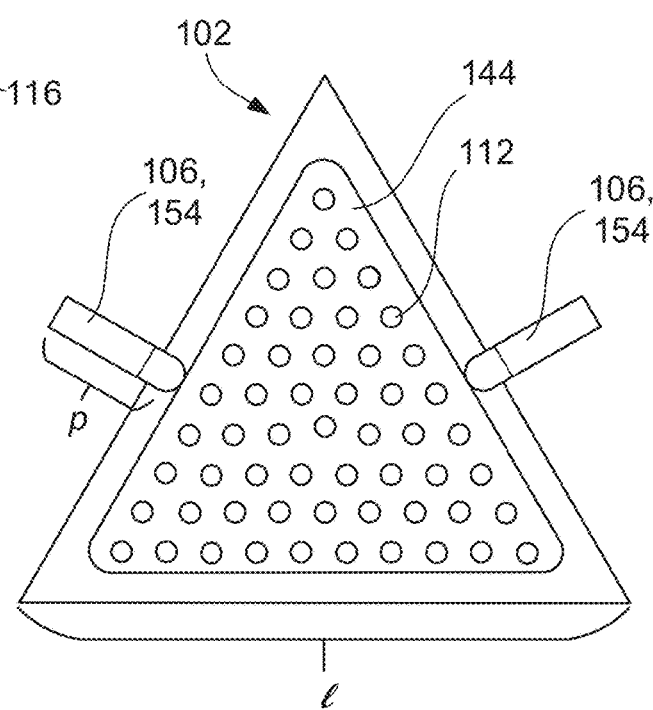
FIG. 5 is a top view of the canister of FIG. 4.

Referring to FIGS. 4-5, the body 114 includes a bottom wall 144 and three side walls 116 extending upwardly from the bottom wall 144. Bottom wall 144 defines multiple holes 112 that allow a cryogenic substance (e.g., liquid and/or vaporous nitrogen) to flow through freely. The three side walls 116 together define the edge 122 and are integrally connected to form a triangular prism shape. Thus, body 114 is a substantially triangular body. Body 114 defines a canister opening 118 at the edge 122. The hooks 106 extend from the edge 122 along opposing side walls 116. Each hook includes a substantially vertical portion 152 and a substantially horizontal portion 154 (refer to FIG. 2). Lateral and vertical extents of the horizontal and vertical portions 154, 152 of hooks 106 allow the hooks 106 to engage with a feature of a cryogenic storage container (e.g., an indentation on a lip of a dewar or a notch on an inner wall of a dewar), thereby allowing the body 114 of the canister 102 to hang within an interior space of the cryogenic storage container.

The body 114 of the canister 102 typically has a height h of about 20 cm to about 36 cm (e.g., about 28 cm). Each side wall 116 of the body 114 typically has a length l of about 4 cm to about 12 cm (e.g., about 8.1 cm), such that bottom wall 144 has an equilateral triangular shape and a wall thickness of about 1 mm to about 7 mm, (e.g., about 4 mm). The bottom wall 144 of the body 114 typically has a wall thickness of about 6 mm to about 14 mm, (e.g., about 10 mm). Each hole 112 defined by the bottom wall 114 typically has a diameter of about 1 mm to about 4 mm, (e.g., about 2.5 mm). Each hook 106 typically has a width of about 3 mm to about 7 mm (e.g., about 5 mm). The hooks 106 typically have a height h' of about 1.5 cm to about 4.5 cm (e.g., about 2.8 cm) and a protrusion length p of about 1 cm to about 3 cm (e.g., about 1.9 cm). The protrusion length p and height h' form an angle 142 that is about 90 degrees. An upper surface of the bottom wall 144 of canister 102 typically has a surface area of about 10 $cm^2$ to about 24 $cm^2$ (e.g., about 16.7 $cm^2$), and a lower surface of the bottom wall 144 of canister 102 typically has a surface area of about 20 $cm^2$ to about 31 $cm^2$ (e.g., about 25.7 $cm^2$).

The canister 102 is typically made of one or more rigid materials that can withstand cold temperatures, such as temperatures down to about −150 to −273° C. (e.g., about −196° C.). Example materials from which the canister 102 may be made include aluminum, stainless steel, polypropylene, polystyrene, acrylic, and styrene acrylic copolymers. The canister 102 is typically manufactured via one or more manufacturing techniques, such as extrusion, casting, and molding.

Figures 6, 7:
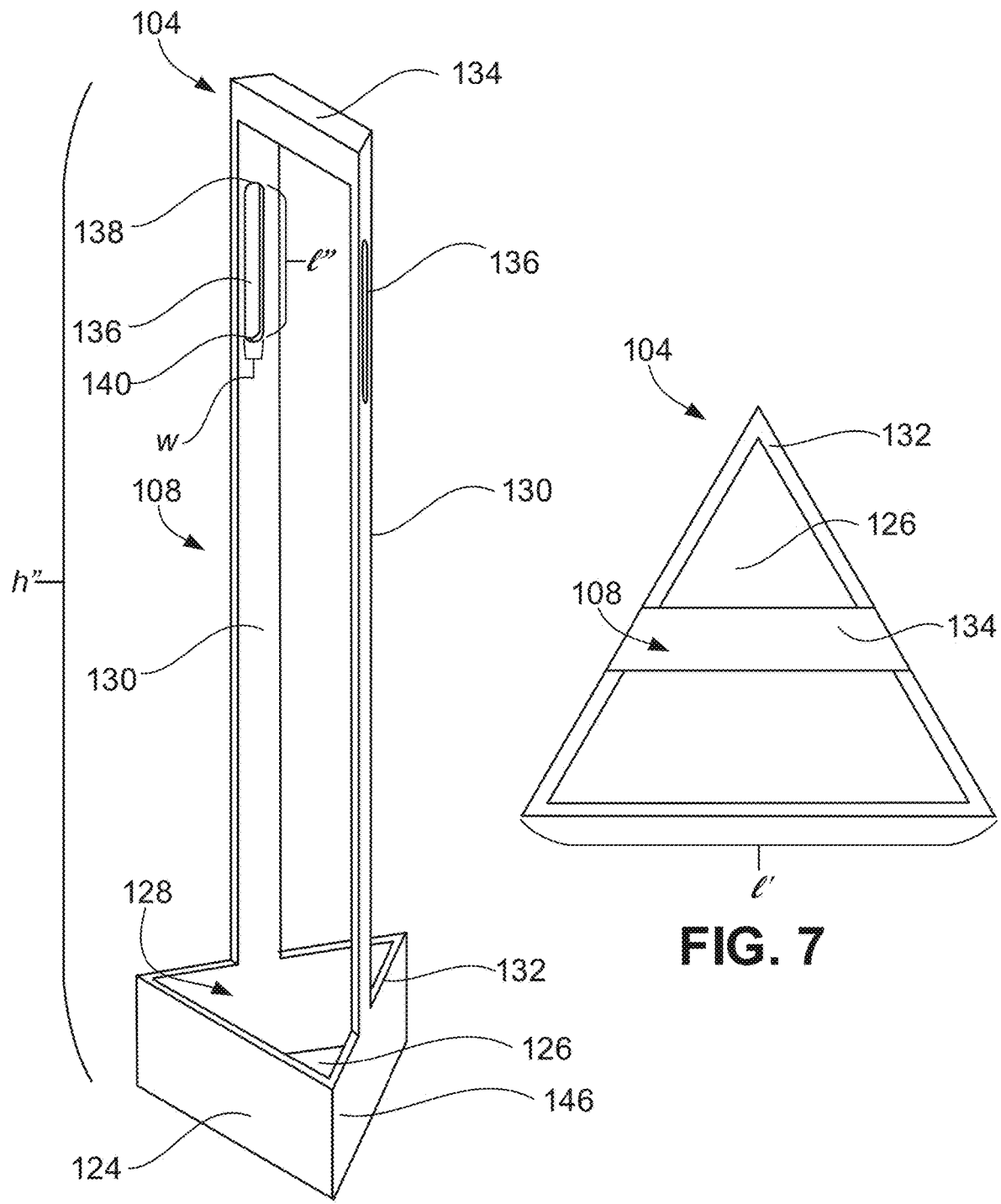
FIG. 6 is a perspective view of a holder of the canister assembly of FIG. 1.
FIG. 7 is a top view of the holder of FIG. 6.

Referring to FIGS. 6-7, the holder 104 is provided as an inverted cap and includes a receptacle 124 and a handle 108 that extends upward from the receptacle 124. Receptacle 124 is formed to receive the bottom wall 144 of the body 114 of canister 102. For example, the holder 104 is formed to securely hold the canister 102 in a nested arrangement. Holder 104 includes a bottom wall 126 and three side walls 146 that extend upward from the bottom wall 126. In order to allow for the nested arrangement with the canister 102, the surface area of an upper surface of bottom wall 126 is slightly larger than the surface area of the lower surface of the bottom wall 144 of the body 114 of canister 102. The larger surface area of the bottom wall 126 of the holder 104 allows for some play or slack in the positioning of the canister 102 within the receptacle 124. Side walls 146 are integrally connected and form a triangular prism shape, similar to the shape of the body 114 of the canister 102. Thus, receptacle 124 is a substantially triangular receptacle. The three walls 146 together form a top edge 132 of the receptacle 124 and define an opening 128 formed to receive the body 114 of canister 102.

The handle 108 includes a pair of parallel legs 130 (e.g., vertical members) extending from the top edge 132 of the receptacle 124 and connected by a transverse member 134 at opposite ends. Thus, handle 108 has an inverted U-shape. Each leg 130 of the receptacle 124 defines a slot 136 spaced from the transverse member 134. The slots 136 are formed to receive respective hooks 106 of canister 102. The slots 136 serve as a guide or mechanism to direct the movement of the hooks 106 when the canister assembly 100 is in an assembled state and lifted upwards by handle 108. For example, the hooks 106 can travel vertically within the slots 136. The slots 136 are elongate and include upper and lower curved ends 138, 140.

The holder 104 typically has a total height h" of about 30 cm to about 50 cm (e.g., about 41 cm). The three side walls 146 of the receptacle 104 typically have a length l' of about 6 cm to about 13 cm (e.g., about 9.5 cm), such that bottom surface 126 has an equilateral triangle shape. Receptacle 124 of holder 104 typically has a wall thickness of about 2 mm to about 4 mm (e.g., about 3 mm). The slots 136 typically have a length l" of about 5 cm to about 8 cm (e.g., about 6.6 cm) and a width w of about 4 mm to about 8 mm (e.g., about 6 mm). Each slot 136 is typically spaced from the transverse member 134 by about 3 cm to about 5 cm (e.g., about 4.2 cm). Bottom wall 126 of holder 104 typically has an upper, usable area of about 20 cm$^2$ to about 40 cm$^2$ (e.g., about 31.3 cm$^2$) for mating with the body 114 of canister 102 in the nested arrangement.

The holder 104 is typically made of one or more rigid materials that can withstand cold temperatures, such as temperatures down to about −150 to −273° C. (e.g., about −196° C.). Example materials from which the holder 104 is typically made include aluminum, stainless steel, polypropylene, polystyrene, acrylic, and styrene acrylic copolymers. The holder 104 is typically manufactured via one or more manufacturing techniques, such as extrusion, casting, and molding.

Referring to FIGS. 8-9, the canister assembly 100 is shown assembled, in an "open" and "closed" state, respectfully. While canister assembly 100 is in use and stored in a cryogenic storage container (e.g., a cryogenic storage dewar), the hooks 106 of the canister 102 can engage the cryogenic storage container. For example, the hooks 106 can engage one or more indentations on a lip of the cryogenic container or one or more notches on an inner wall of the cryogenic storage container, thereby allowing the holder 104 to hang underneath the canister 102, as shown in FIG. 8. Thus, the canister 102 is "uncapped" or in an "open" state and allowing for the free flow of a cryogenic substance (e.g., liquid nitrogen and/or nitrogen vapors) in and out of the holes 112 through the bottom wall 144 of the body 114 of canister 102, which enables proper cooling of samples stored in the canister 102. In the "open" state, the horizontal portion 154 of each hook 106 abuts the curved end 138 of each slot 110. Moreover, in the "open" state, the bottom wall 144 of the body 114 of canister 102 does not contact the bottom wall 126 of the receptacle 124. That is, the canister 102 is spaced apart from the holder 104.

When the canister 102 is ready to be removed from the interior space of the cryogenic storage container, the user (e.g., a clinician or a scientist) grasps the handle 108 of the holder 104 by the transverse member 134 and pulls the handle 108 upwardly. Pulling of the handle 108 causes the slots 110 within the handle 108 to move upward relative to the hooks 106 of the canister 102 until the receptacle 124 of the holder 104 abuts the bottom wall 144 of the body 114 of canister 102. Once the receptacle 124 contacts the bottom wall 144, continued pulling of the handle 108 also moves the canister 102 upward, thereby causing the hooks 106 to move upward and to disengage from the cryogenic storage container. Pulling of the handle 108 thus causes the receptacle 124 to receive the body 114 of canister 102 to place the canister assembly 100 in the nested arrangement and the "closed" state, as shown in FIG. 9.

While in the "closed" state, the slots 110 and the hooks 106 effectively slide relative to each other, but the hooks 106 do not come into contact with the lower curved ends 140 of slots 110. Furthermore, while the body 114 of canister 102 is received within the receptacle 124 of the holder 104, a small amount of the cryogenic substance remains trapped in the canister 102 and thereby helps to maintain the samples within the canister 102 at a cryogenic temperature, which provides the user with additional time to correctly identify and retrieve a sample (e.g., a biological sample) without damage to the sample due to unwanted rapid defrosting.

Figure 10:
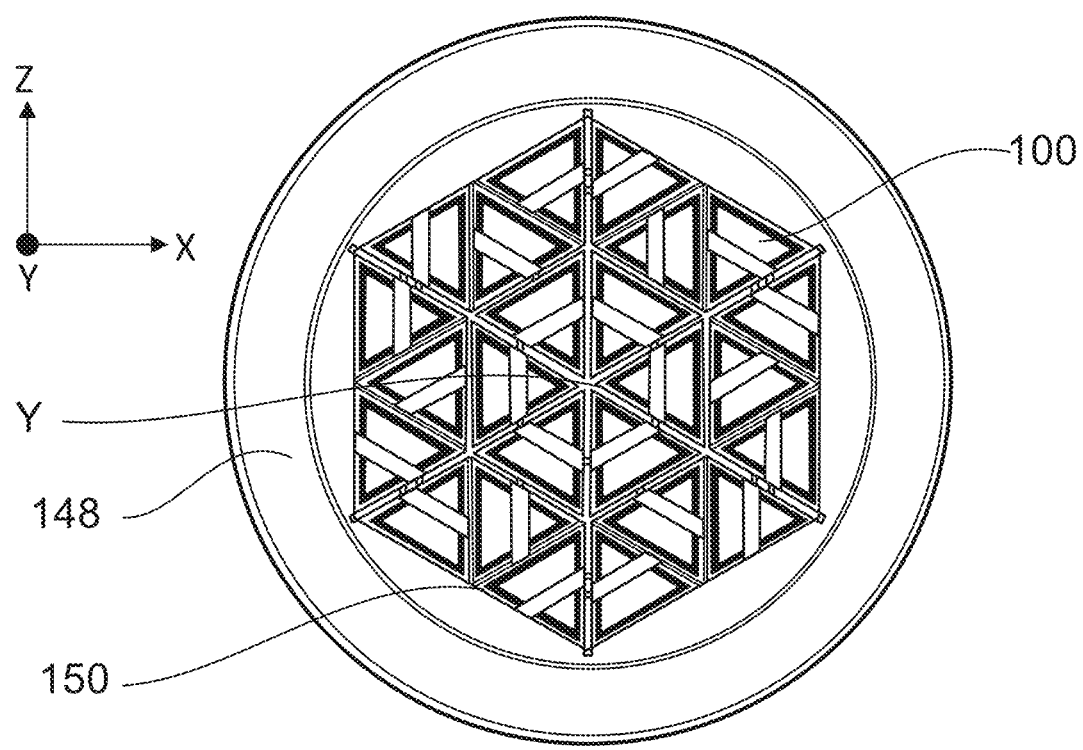
FIG. 10 is a top cross-sectional view of a cryogenic storage container containing multiple of the canister assemblies of FIG. 1.

Referring to FIG. 10, the canister assembly 100 is designed to maximize carrier capacity within a cryogenic storage container 148 (e.g., a housing that surrounds the canister assembly 100, such as a cryogenic storage dewar). For example, the triangular shape of canister assembly 100 enables efficient packing of multiple canister assemblies 100 within the cryogenic storage container 148, as shown in FIG. 10. In particular, the triangular shape of the canister assembly 100 allows for hexagonal packing that can increase storage capacity. The shape of the canister assembly 100 can also improve the thermal efficiency during the identification and retrieval of a cryopreserved sample from the canister 102 in a cryogenic container full of a cryogenic substance due to a reduced opening area between multiple canisters 102 and reduced exposure of the side walls 116 to ambient temperature, in comparison to traditional cryogenic storage devices. Cryogenic storage container 148 can further include a centrally rotatable support structure 150 that can rotate about a central axis Y, which is out of the page in FIG. 10. The support structure 150 can be rotatable via a gear with a manual crank, for example. The user may minimize the time she or he takes to select a canister assembly 100 by rotating the support structure 150 and identifying (e.g., by viewing labels) the one or more canister assemblies 100.

While the above-discussed canister assembly 100 and cryogenic storage container 148 have been described and illustrated with respect to certain dimensions, shapes, arrangements, configurations, material formulations, and methods, in some embodiments, a canister assembly or a cryogenic storage container 148 that is otherwise substantially similar in construction and function to the canister assembly 100 or the cryogenic storage container 148 may include one or more dimensions, shapes, arrangements, configurations, and/or materials formulations that are different from the ones discussed above or may be used with respect to methods that are modified as compared to the methods described above. For example, while the canister assembly 100 has been described and illustrated as including a canister 102 and a holder 104 with substantially triangular shapes, in some embodiments, a canister assembly that is otherwise substantially similar in construction and function to the canister assembly 100 may alternatively include a cooperating canister and holder with a body and a receptacle, respectively, that have a substantially cylindrical shape (e.g., with a circular cross-sectional shape).

FIGS. 11-14 illustrate examples of a canister assembly 200 and a cryogenic storage container 248 that are otherwise substantially similar in construction and function to the canister assembly 100 or the cryogenic storage container 148 but may include one or more dimensions, shapes, arrangements, and/or configurations that are different from the ones discussed above. For example, canister assembly 200 includes a cooperating canister 202 and holder 204 with a body 214 and a receptacle 224, respectively, that have a substantially cylindrical shape (e.g., with a circular cross-sectional shape).

Figure 11:
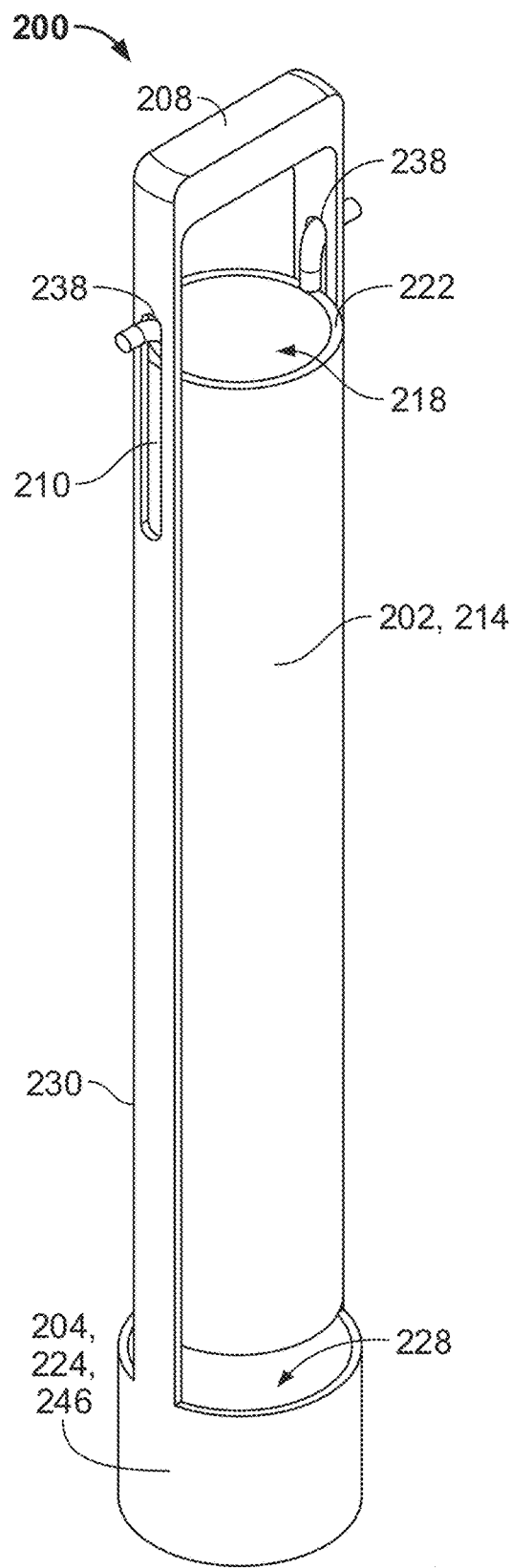
FIG. 11 is a perspective view of an example canister assembly that can be used to store a sample in a cryogenic environment.
Figure 12:
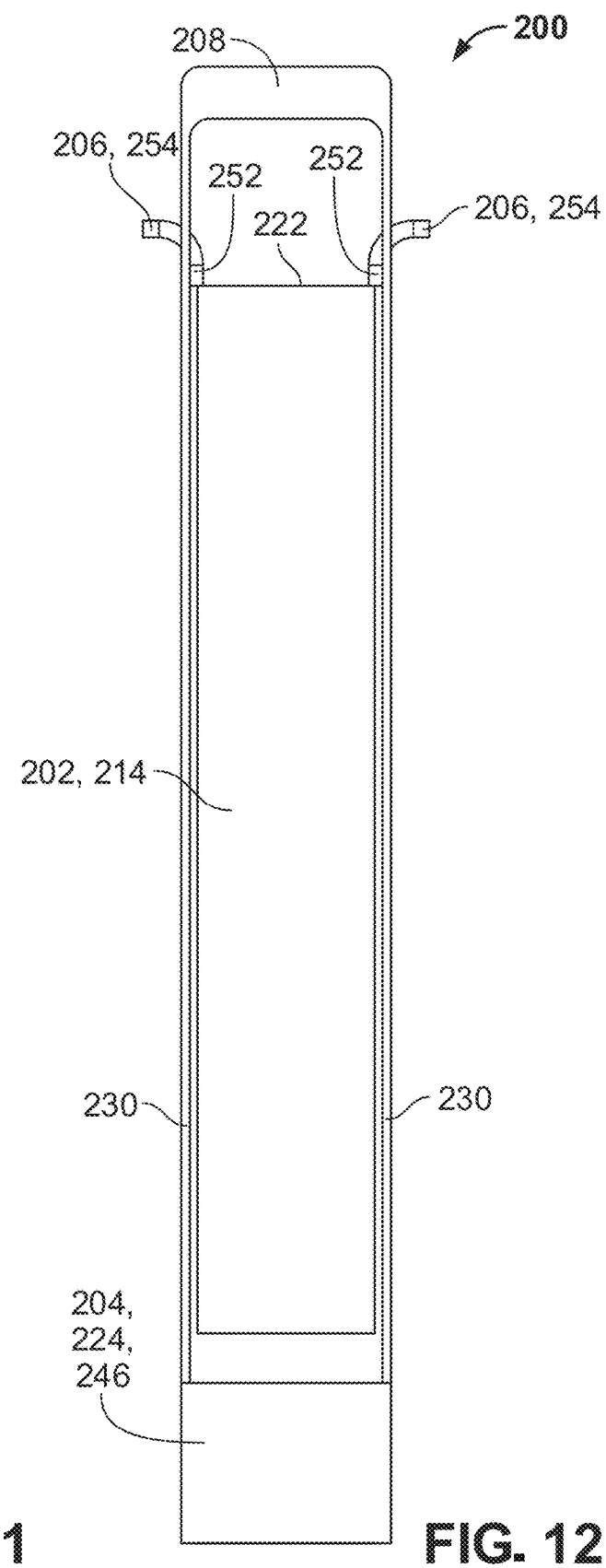
FIG. 12 is a side view of the canister assembly of FIG. 11.
Figure 13:
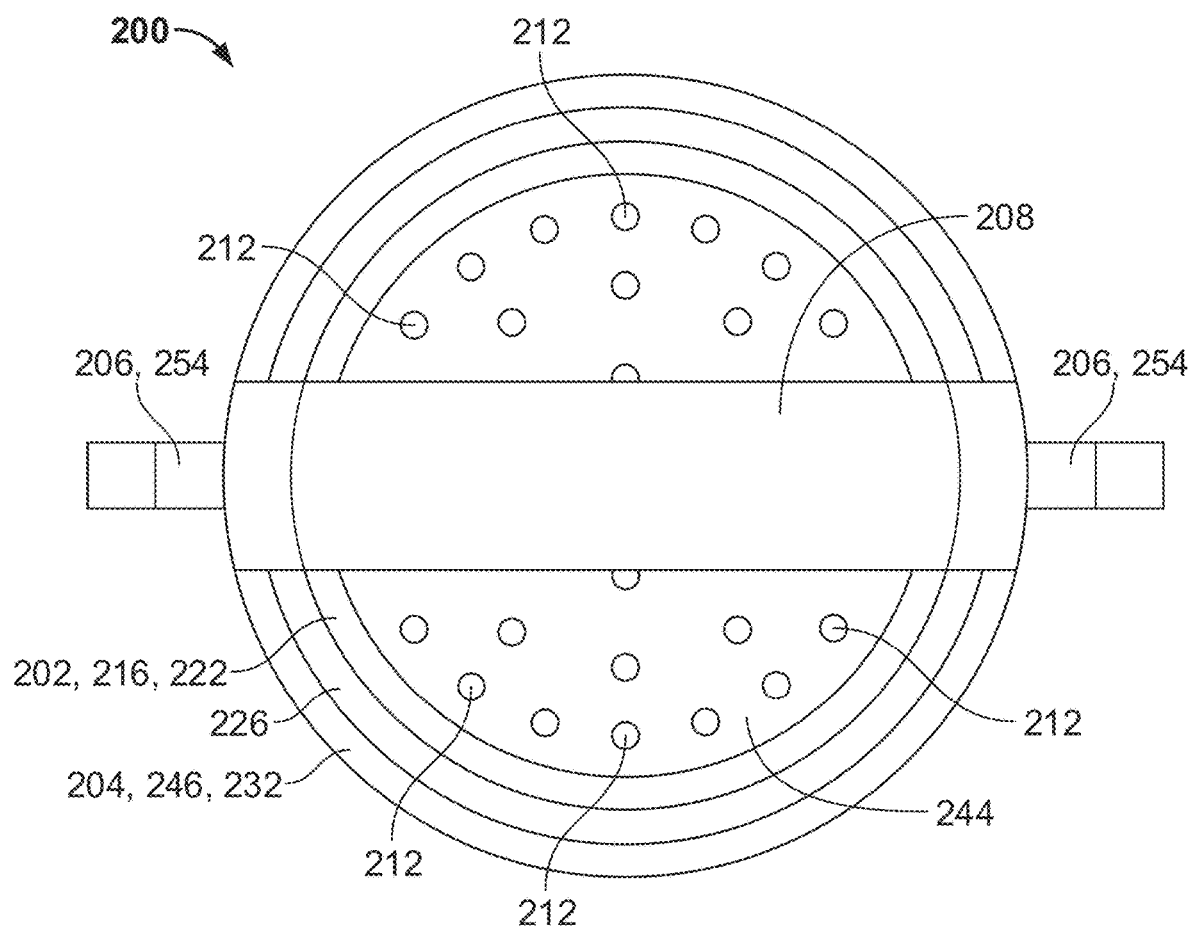
FIG. 13 is a top view of the canister assembly of FIG. 11.

FIGS. 11-13 illustrate the canister assembly 200 which can be used to store samples (e.g., biological samples) in a cryogenic storage container (e.g., a cryogenic storage dewar). The canister assembly 200 is a separable assembly that includes a canister 202 that defines an interior space where samples can be stored and a holder 204 formed to receive the canister 202. Canister 202 includes a body 214 and a pair of hooks 206 extending from a top edge 222 of the body 214. Body 214 defines a canister opening 218 at the edge 222. The body 214 includes a bottom wall 244 and a wall 216 extending upwardly from the bottom wall 244. Bottom wall 244 defines multiple holes 212 that allow a cryogenic substance (e.g., liquid and/or vaporous nitrogen) to flow through freely. The hooks 206 extend from the edge 222 along opposing sides of wall 216. Each hook 206 includes a substantially vertical portion 252 and a substantially horizontal portion 254 (refer to FIG. 12). In the "open" state, the horizontal portion 254 of each hook 206 abuts the curved end 238 of each slot 210. Moreover, in the "open" state, the bottom wall 144 of the body 114 of canister 102 does not contact the bottom wall 126 of the receptacle 124. That is, the canister 102 is spaced apart from the holder 104.

The holder 204 is provided as an inverted cap and includes a receptacle 224 and a handle 208 that extends upward from the receptacle 224. Receptacle 224 is formed to receive the bottom wall 244 of the body 214 of canister 202. For example, the holder 204 is formed to securely hold the canister 202 in a nested arrangement. Holder 204 includes a bottom wall 226 and a receptacle wall 246 that extends upward from the bottom wall 226. The receptacle wall 246 is integrally connected with parallel legs 230 (e.g., vertical members). The receptacle wall 246 has a cylindrical shape, similar to the shape of the body 214 of the canister 202. Thus, receptacle 224 is a substantially cylindrical receptacle. The receptacle wall 246 forms a top edge 232 of the receptacle 224 and define an opening 228 formed to receive the body 214 of canister 202.

Figure 14:
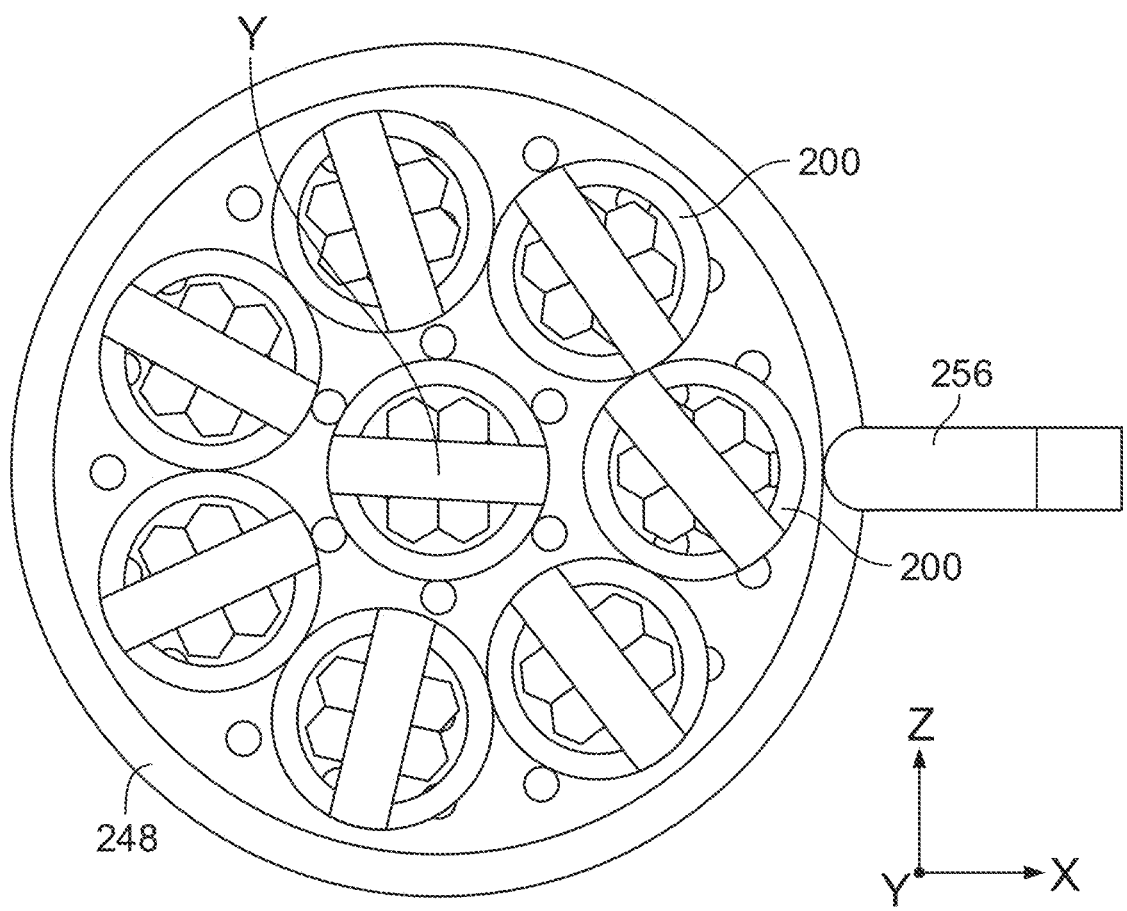
FIG. 14 is a top cross-sectional view of a cryogenic storage container containing multiple of the canister assemblies of FIG. 11.

Referring to FIG. 14, the canister assembly 200 is designed to increase (e.g., maximize) carrier capacity within a cryogenic storage container 248 (e.g., a housing that surrounds the canister assembly 200, such as a cryogenic storage dewar). The cryogenic storage container 248 includes a handle 256 protruding horizontally (i.e., in the direction of the X axis) away from the cryogenic storage container 248. The user (e.g., a clinician or a scientist) can grasp the handle 256 of the cryogenic storage container 248 to pull the cryogenic storage container 248 upwardly and remove it from an interior of a larger cryogenic storage container receiving cryogenic storage container 248, or the user can grasp the handle 256 to manipulate (e.g., rotate) the cryogenic storage container 248. The cylindrical shape of canister assembly 200 enables efficient packing of multiple cryogenic storage tubes 258 within the cryogenic storage container 248.

As shown in FIG. 14, the canister assembly 200 can receive multiple cryogenic storage tubes 258 having a hexagonal shape; however, in some embodiments, the canister assembly 200 can receive multiple cryogenic storage tubes of various size and shapes such as, but not limited to, cryogenic storage tubes having a cylindrical shape, a triangular shape, or any other suitable shape. The shape of the canister assembly 200 can also improve the thermal efficiency during the identification and retrieval of a cryopreserved sample from the canister 202 in a cryogenic container full of a cryogenic substance due to a reduced opening area between multiple canisters 202 and reduced exposure of the walls 216 to ambient temperature, in comparison to traditional cryogenic storage devices. In some embodiments, cryogenic storage container 248 can further include a centrally rotatable support structure that can rotate about a central axis Y, which is out of the page in FIG. 14. The support structure can be rotatable via a gear with a manual crank, for example. The user may minimize the time she or he takes to select a canister assembly 200 by rotating the support structure and identifying (e.g., by viewing labels) the one or more canister assemblies 200.

While the canisters 102, 202 have been described and illustrated as including the hooks 106, 206 that have a substantially 90 degree bend, in some embodiments, a canister that is otherwise substantially similar in construction and function to the canisters 102, 202 may include hooks that have a different degree of bending or that have curved bends.

While the holders 104, 204 have been described and illustrated as including the handles 108, 208 with a generally rectangular (e.g., inverted U shape), in some embodiments, a holder that is otherwise substantially similar in construction and function to the holders 104, 204 may include a handle that have a different shape, such as a curved or rounded shape.

Other embodiments are also within the scope of the following claims.

What is claimed is:

1. A canister assembly comprising:
   a canister comprising a body for storing samples and hooks that extend from
   the body for engaging a surrounding housing; and
   a cap for closing the canister, the cap comprising:
   a receptacle comprising:
   a bottom wall; and
   one or more walls extending upward from the bottom wall and defining an opening of the receptacle that is configured to receive the body of the canister; and
   a handle extending upward from the receptacle and defining vertical slots in which the hooks of the canister are positioned.

2. The canister assembly of claim 1, wherein the one or more walls comprises three side walls.

3. The canister assembly of claim 1, wherein the handle has a length of about 24 cm to about 37 cm.

4. The canister assembly of claim 1, wherein each of the receptacle of the cap and the body of the canister has a triangular shape.

5. The canister assembly of claim 1, wherein each of the receptacle of the cap and the body of the canister has a cylindrical shape.

6. The canister assembly of claim 1, wherein the handle has an inverted U shape.

7. The canister assembly of claim 1, wherein the handle comprises two vertical members that extend respectively from opposite sides of the one or more walls.

8. The canister assembly of claim 7, wherein the two vertical members respectively define the vertical slots.

9. The canister assembly of claim 8, wherein the handle further comprises a horizontal member that extends between the two vertical members and that is configured to be grasped by a hand of a user.

10. The canister assembly of claim 9, wherein the vertical slots are spaced apart from the horizontal member by a distance of about 3 cm to about 5 cm.

11. The canister assembly of claim 8, wherein the hooks of the canister are slidable within the vertical slots of the cap.

12. The canister assembly of claim 11, wherein the vertical slots have a length of about 5 cm to about 8 cm.

13. The canister assembly of claim 1, wherein the receptacle of the cap is configured to receive the body of the canister in a nested arrangement.

14. The canister assembly of claim 1, wherein the body of the canister comprises a bottom wall that defines a plurality of through holes for allowing passage of a fluid between the body and the receptacle of the cap.

15. The canister assembly of claim 14, wherein each through hole of the plurality of through holes has a diameter ranging from about 1 mm to about 4 mm.

16. A method of handling a canister, the method comprising:
pulling a handle of a cap upward, thereby moving slots of the handle upward
with respect to hooks of the canister that are positioned within the slots and secured to a surrounding housing, the handle extending upward from a receptacle of the cap; and
abutting a receptacle of the cap with a body of the canister to move the
canister upward, thereby disengaging the hooks of the canister from the surrounding housing.

* * * * *